United States Patent [19]

Barber, Jr.

[11] Patent Number: 5,044,214
[45] Date of Patent: Sep. 3, 1991

[54] TOROIDAL TRANSMISSION WITH SPLIT TORQUE AND EQUALIZATION PLANETARY DRIVE

[76] Inventor: John S. Barber, Jr., 45 Cedar Bluff Dr., Apt. 5, Lake St. Louis, Mo. 63367

[21] Appl. No.: 448,729

[22] Filed: Dec. 11, 1989

[51] Int. Cl.⁵ ............................................. F16H 15/16
[52] U.S. Cl. ..................................... 74/193; 475/166; 74/200
[58] Field of Search ................. 74/193, 194, 196, 200; 475/165, 166, 214, 215, 216, 217; 403/1, 61, 63

[56] References Cited

U.S. PATENT DOCUMENTS

| | | | |
|---|---|---|---|
| 2,164,504 | 7/1939 | Dodge | 475/214 X |
| 2,716,357 | 8/1955 | Rennerfelt | 475/216 |
| 3,739,658 | 6/1973 | Scheiter | 475/214 X |
| 4,464,952 | 8/1984 | Stubbs | 475/216 |
| 4,756,211 | 7/1988 | Fellows | 475/214 X |
| 4,885,949 | 12/1989 | Barber, Jr. | 74/193 |
| 4,885,955 | 12/1989 | Kraus | 475/216 X |
| 4,922,788 | 5/1990 | Greenwood | 475/216 X |

FOREIGN PATENT DOCUMENTS

| | | | |
|---|---|---|---|
| 551818 | 6/1932 | Fed. Rep. of Germany | 475/217 |
| 577118 | 5/1933 | Fed. Rep. of Germany | 475/217 |
| 3204362 | 8/1983 | Fed. Rep. of Germany | 403/1 |
| 3623024 | 1/1988 | Fed. Rep. of Germany | 403/1 |
| 46022 | 2/1987 | Japan | 403/1 |
| 1016573 | 5/1983 | U.S.S.R. | 403/1 |

Primary Examiner—Allan D. Herrmann
Assistant Examiner—Khoi Q. Ta
Attorney, Agent, or Firm—Paul M. Denk

[57] ABSTRACT

A traction transmission mechanism comprising toric shaped inner and outer race elements, a series of pairs of transmission rollers arranged between the race elements, an epicycle gear train, and drive shaft and driven shaft or other structure constructively cooperating with the mechanism, to efficiently and compactly furnish output force, in either direction, with the transmission incorporating various load equalization mechanisms to balance roller element tangential and radial forces.

8 Claims, 5 Drawing Sheets

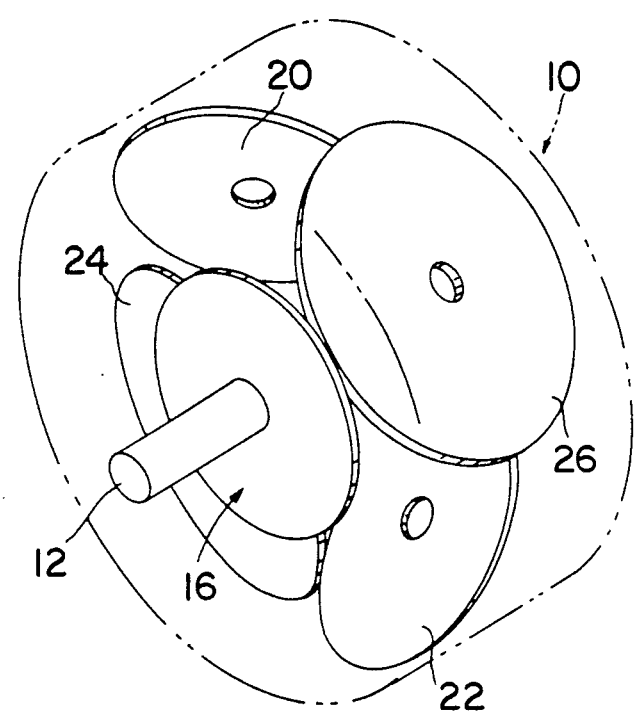
FIG. IA

TOROIDAL TRANSMISSION WITH SPLIT TORQUE AND EQUALIZATION PLANETARY DRIVE

BACKGROUND—CROSS—REFERENCE TO RELATED APPLICATION

This invention is related to the invention of the application of the same title, Ser. No. 167,489, filed on Mar. 14, 1988, and now U.S. Pat. No. 4,885,949.

BACKGROUND OF THE INVENTION

This invention relates generally to improvements in a single cavity, toric type, continuously variable transmission and more specifically to improvements in the output from such variable transmission.

A previous and related application concerning a continuously variable or fixed ratio velocity transmission mechanism, as shown in the above identified patent from which this application derives, disclosed an improvement to toroid type continuously variable transmission, incorporating various adjustment mechanisms, to equalize forces generated within and through this particular transmission during its functioning. A further refinement to the operation of this transmission can be obtained by the addition of epicycle gears across what is depicted as the input and output shaft to form a new output type shaft and thereby, an improved transmission mechanism.

The prior art shows at least two arrangements of a single cavity toroid type transmission, of which this invention pertains, where either the inner race or outer race is driven by the prime mover and the outer race element drives the load. Such arrangements are shown in Hayes' U.S. Pat. Nos. 2,123,006 and 2,123,008 and is discussed in my U.S. Pat. No. 4,628,766. Such an arrangement does not take full advantage of the torque characteristics of the continuously variable transmission, particularly when the prime mover drives the inner race. The torque capacity of this single cavity type of continuously variable transmission generates the maximum torque when the the continuously variable transmission ratio in nearly 1:1 or when the disks are at a nearly horizontal position. For example, in an automobile, when the continuously variable transmission is configured such that the prime mover is driving the inner race, and the vehicle is moving away from rest, the output torque capacity of the continuously variable transmission is at a minimum while the torque demand of the automobile is at a maximum. Therefore, the continuously variable transmission size will be much greater than is necessary to meet output torque requirements across the majority of the continuously variable transmission speed ratio range.

The prior art also shows a variety of variable speed transmission concepts that employ epicycle gears to alter the overall ratio range of a variable speed transmission. Such arrangements, in some manner, bridge the input and output shaft of the transmission to share power with the transmission. In some cases these arrangements employ multiple modes of power transfer where the continuously variable transmission operates in conjunction with an epicycle gear set over a portion of the continuously variable transmission ratio range and then shifts to another epicycle gear set, configured differently than the first. This is also accomplished, in some cases, such that the transition is synchronous, that is, requiring no ratio change of the continuously variable transmission during the transition between modes.

Examples of epicycles gears, also generally defined as planetary gears, used in conjunction with a continuously variable transmission are shown in United States patents granted to Perry, such as U.S. Pat. No. 3,406,597; U.S. Pat. No. 4,297,918 and U.S. Pat. No. 4,628,766. Also, U.S. patents have been granted to Kemper covering describing epicycle gears used for ratio expansion such as 4,yyy,yyy.

The prior art also shows a series of force equalizations within the cavity of a single cavity toric type continuously variable transmission where the load or force acting on the roller is allowed to equalize in both the tangential and normal direction. These equalization schemes provide for a variation in the positioning of the outer race to allow equalization of the roller normal load. My U.S. Pat. No. 4,628,766 shows the roller normal and tangential load equalization means while Hayes shows tangential and other equalization mechanisms in U.S. Pat. No. 2,123,006.

In summary, the use of epicycle gears with a continuously variable transmission has been concerned with the expansion of the transmission ratio range or properly matching speeds and torques between the prime mover and the load, such as an automobile engine and automobile drive wheels. But, the current invention, to be summarized hereafter, is believed to provide rather unique refinements to the functioning of the single cavity type continuously variable transmission described herein. This improvement can significantly reduce the size of the continuously variable transmission for a given load while improving the operating efficiency of the transmission in certain portions of the operating range.

OBJECTS AND ADVANTAGES

This transmission should include at least a single toroid cavity structured continuously variable transmission, combined with epicycle or planetary gears to provide very smooth variation of transmission speeds and torque between a prime mover and load such as an internal combustion engine and an automobile. More specifically, the design of this transmission does incorporate, at least in overall appearance, the usual type of race means, generally formed of the inner and outer toroid design, having an interposing disc or roller, which is designed to transmit torque as disc tangential force between the inner and outer race, or perhaps from the outer race to the inner race. The arrangement of the rollers between the inner and outer race is designed as opposing pairs so as to eliminate thrust bearing forces found in other single cavity toroid type designs. A complete description of the continuously variable transmission portion of this design can be found in my U.S. Pat. No. 4,885,949.

Accordingly, several objects and advantages of my invention are to reduce the size, increase the operating efficiency and generally improve the operating characteristics of a single cavity, toroid type continuously variable transmission of the type cited in my U.S. Pat. No. 4,885,949.

One object of the invention is reduce the size of the continuously variable transmission portion of the transmission for a given load. The reduction in size of course should significantly reduce the cost required to manufacture the transmission. The size reduction is accomplished by taking advantage of the great torque capacity of the continuously variable transmission at one end of the ratio range and supplement the significantly weaker capacity at the other end of the ratio range.

Another object of this invention is to improve the transmission efficiency by sharing power with a generally more efficient epicycle gear means at the higher output speed of the transmission.

These and other objects will become more apparent to those skilled in the art upon reviewing the description of the preferred embodiment set forth herein, when undertaken in conjunction with a study of its drawings.

DESCRIPTION OF DRAWINGS

In referring to the drawings, FIG. 1 provides a cross section view of the continuously variable transmission means of the invention, shown incorporating a positive ratio, epicycle gear set means within its construction.

DESCRIPTION OF PREFERRED EMBODIMENT

Figure 1:
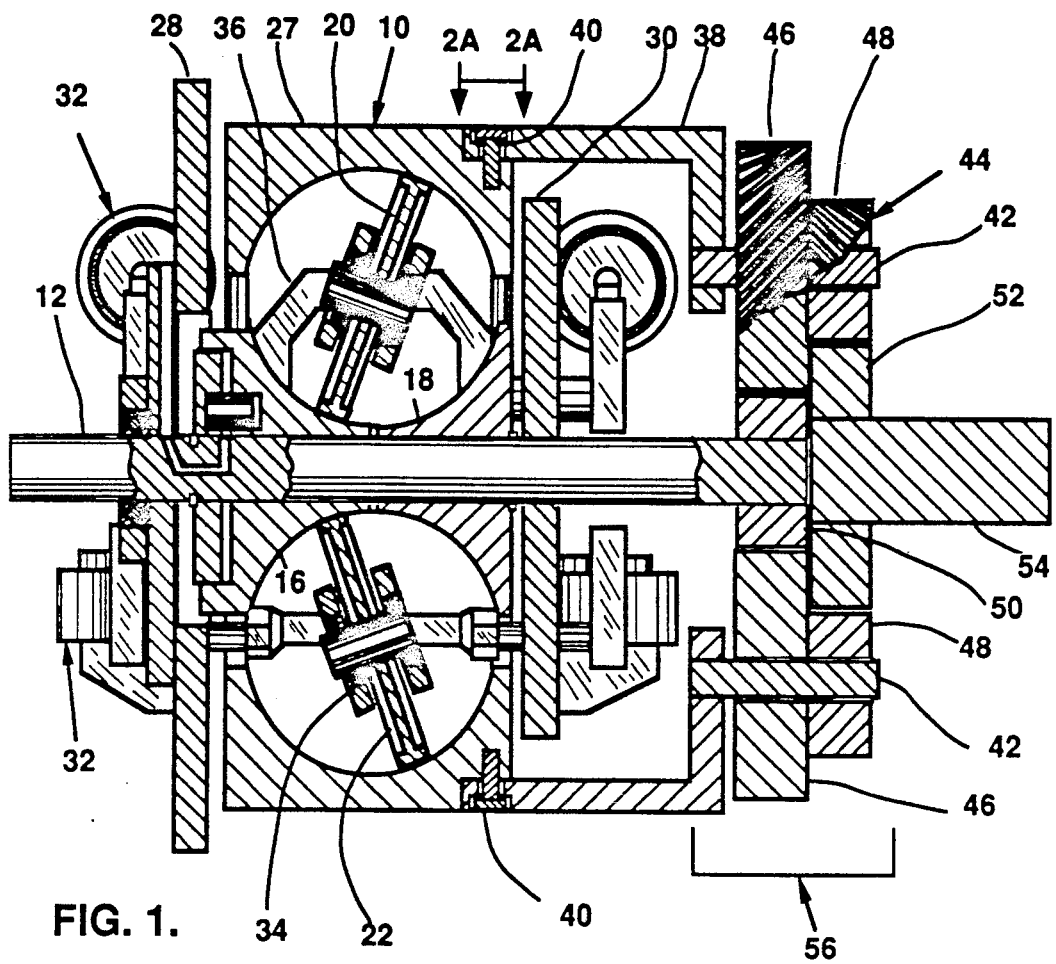
FIG. 1A shows two pairs of transmission roller means provided within the transmission mechanism.
Figure 2A:
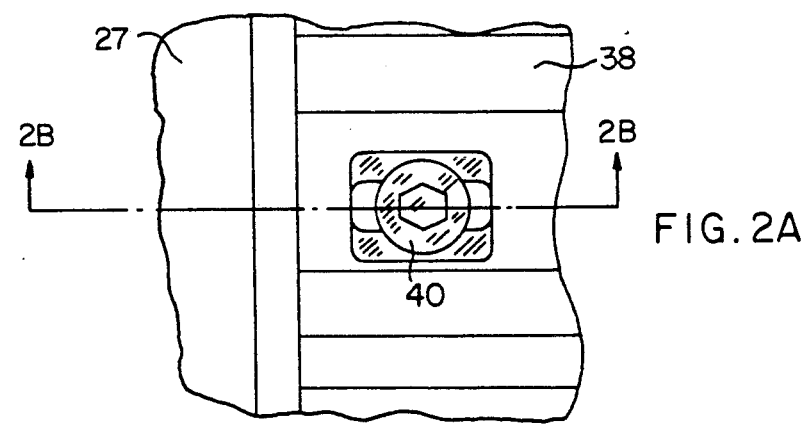
FIG. 2A is a partial top view of the spider connection, taken along the line 2A—2A of FIG. 1.
Figure 2B:
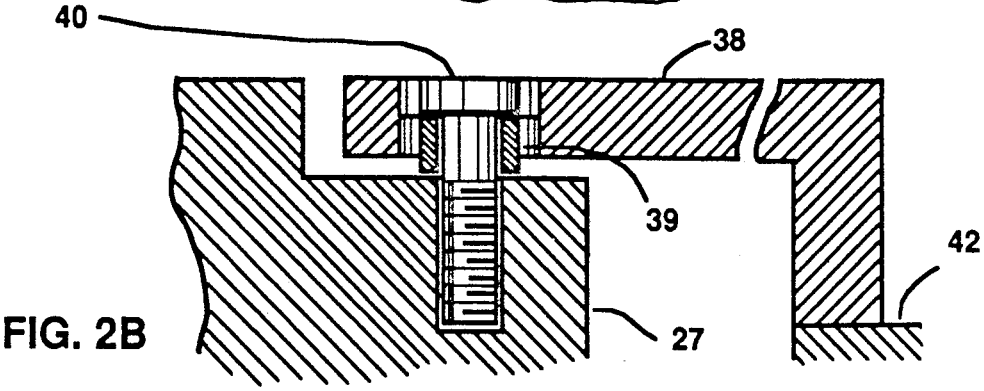
FIG. 2B shows a detailed view of the outer race and spider connection, taken along the line 2B—2B of FIG. 2A.
Figure 3:
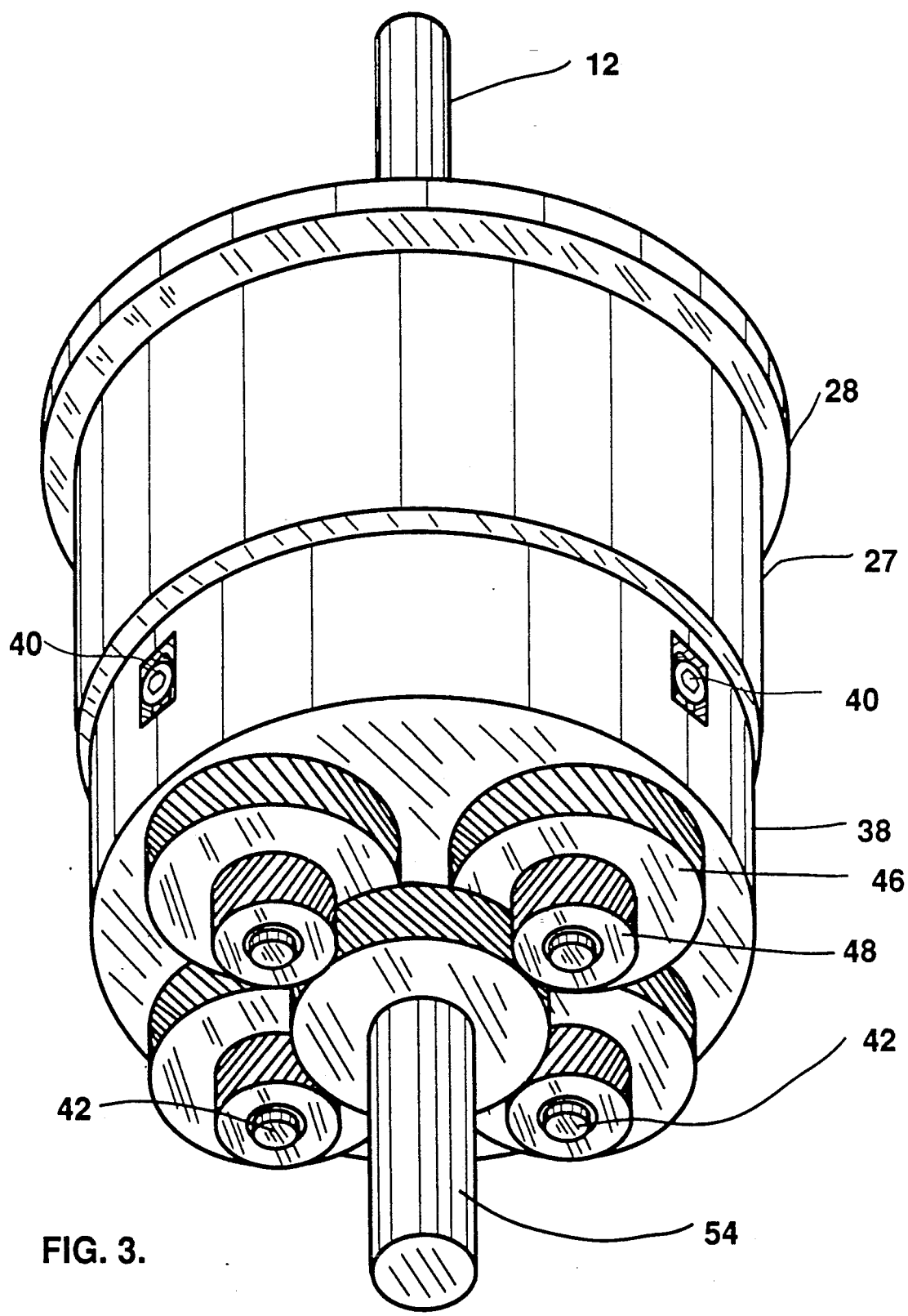
FIG. 3 shows a perspective view of the continuously variable transmission means combined with the epicycle gear means in an assembly view.

In referring to the drawings, and in particular FIGS. 1, 2 and 3, the basic cross section of the essence of this particular invention is shown. As disclosed, the continuously variable transmission 10, is shown as the complete unit to the left of the spider 38. Shown contained therein, and mounted for operation, is the input or output centrally arranged shaft 12, which, in the preferred embodiment, and in this particular instance, functions as the input shaft or driving shaft in which torque is supplied to this particular transmission, during its application. Mounted for rotation upon this particular shaft is an inner race element 14, which in this particular instance, is actually shown as comprising a pair of races, 16 and 18, and which furnish the input traction sufficient to provide for rotation of the pairs of transmission rollers, 20, 22, 24 and 26, as shown in FIG. 1A, related to that as shown in my prior patent. which upon rotation transmit a traction force to the surface of the outer toric race element 27, or the outer toroid, as generally identified herein, to provide for a portion of the output torque to a driven member and which furnishes variation of speeds of operation of the transmission, during its functioning, between that input torque or force applied to it by the driving means, for generating some transmitted but controlled torque to the driven means.

The specific structural details of these components are shown in column 17 and 18 of my prior U.S. Pat. No. 4,885,949, and the definitions are incorporated herein by reference. The transmission means is structurally supported upon a pair of support means. The first one, comprising the plate 28, with a rear support plate 30 being arranged in parallel and to the opposite side of the transmission from the main support plate. Upon the outer surfaces of the respective plates are the various hydraulic control means 32, which are designed for providing the fluid pressure necessary to attain a shifting in the location of the various sets of transmission rollers, with rollers 20 and 22 shown. Each of the transmission rollers is bearing mounted and supported by a shaft within its respective trunnion, 34, as noted, with one end of each trunnion 34 being pivotally mounted to a lever arm support, one as shown at 36, to provide for the longitudinal and tangential shifting of each respective roller, and its supporting trunnion, in order to provide for variations in the speed of rotation of the various rollers, which in the preferred embodiment, would provide for a variation of the speed of rotation of the rotatable outer race element, and the output from the variable speed portion of this transmission.

Figure 4:
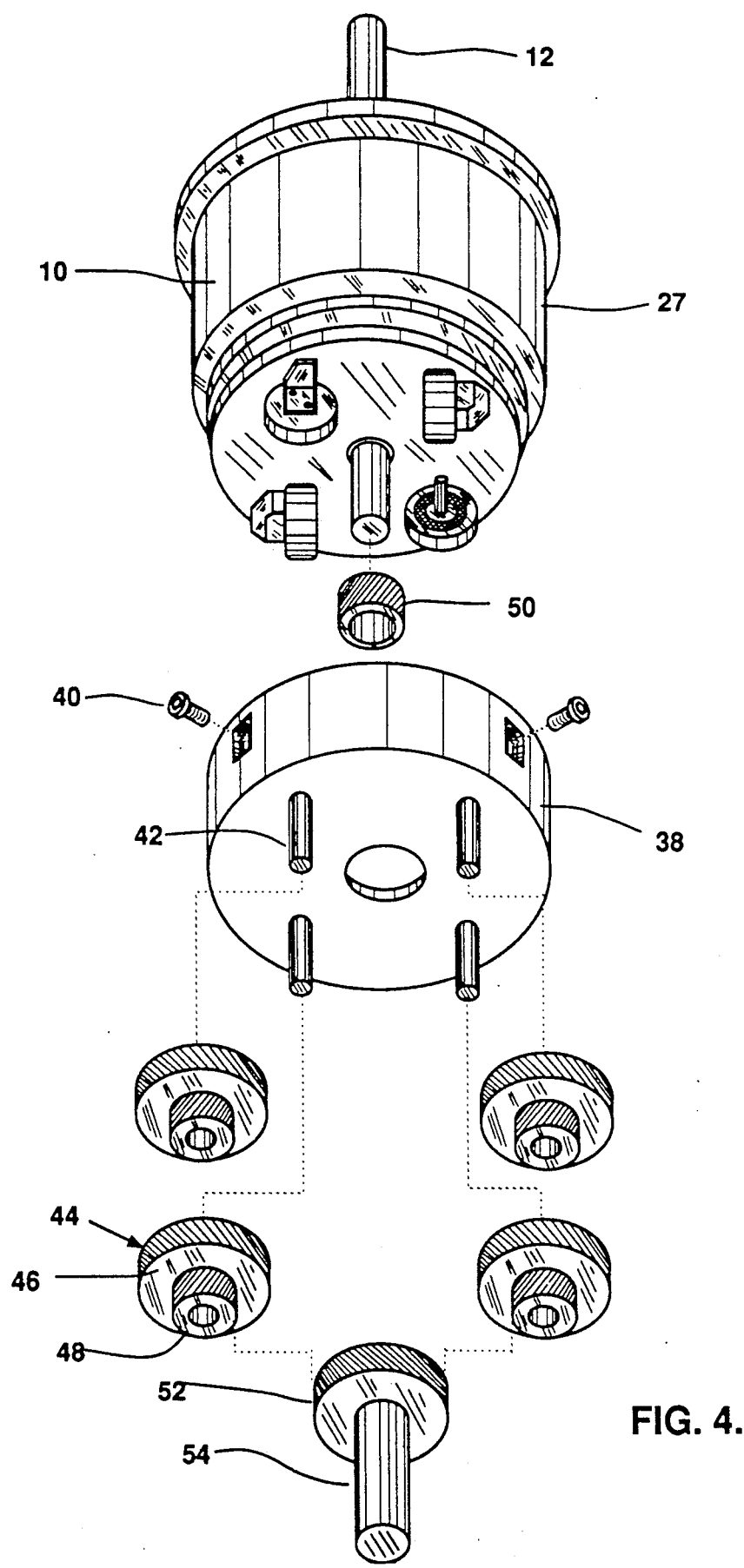
FIG. 4 provides an exploded, perspective view of the continuously variable transmission means and the epicycle gear means.

Attached to the outer race 27, is the spider 38, designed to transmit torque from the outer race to four equally spaced, rigidly mounted, planet gear shafts, concentrically placed about and parallel to the input or output shaft 12. FIG. 4 details, in an exploded view, the arrangement of the planet gear shafts on the spider, with respect to the transmission. The spider 38 is attached to the outer race 27 by four threaded fasteners, through slotted holes in the spider as detailed in FIG. 2A and 2B. The slot axis is parallel to the input shaft 12 to allow free movement of the outer race in the fore and aft, or axial direction. The necessity for the outer race 27, and its adjustment in usage and freedom of movement is explained in detail in my U.S. Pat. No. 4,885,949. Pairs of substantially circular gears 44 are mounted for rotation on each of the four shafts 42. Each planet gear pair 44 is comprised of two circular gears 46 and 48, rigidly connected, but mounted for rotation and transmission of torque. The gears are mounted to transfer power from gear shaft 42 and from the input shaft 12 via gear 50. Gear 50, also substantially circular, is rigidly mounted to shaft 12 through a spline or other suitable means such as a key and key way. The gears shown are helical, to provide quieter and smoother operation than spur gears. It is also conceivable that some form for traction gears instead tradition helical or spur gears. Final power output is transmitted through planet gears 48 to the gear of the output gear 52. The circular output gear 52 is rigidly connected to the output shaft 54 which is mounted for free rotation and absorption of a thrust load, if necessary. It should be noted that if helical gears are utilized in the design of this transmission, the gear pair, 44, should be mounted as opposing helical pairs as shown in FIGS. 1, 3 and 4 to balance axial forces acting on the spider via thrust bearings and retainer rings. This minimizes or even eliminates the axial thrust force acting on the outer race 27, thereby allowing force equalization of the rollers within the continuously variable transmission.

OPERATION

Having provided an explanation of the general summary of the results to be obtained from the structure of this particular invention, and having defined its various components herein with respect to the preferred embodiment of this transmission device, its method of operation should be fairly clear to those having skill in the art in light of the description previously provided. As earlier reviewed, the transmission device basically operates upon the traction principle, and that is to provide means for generating a rotation of a first race element, which in this particular instance, comprises the inner race formed of the pair of race components, 16 and 18. In the preferred embodiment, it is the forced rotation of these various race elements, through the torque provided through the input driving shaft 12, that furnishes a frictional or tractional rotation force to the various pairs of rollers means, or transmission rollers, 20, 22 as shown, with rollers 24 and 26(not shown) as arranged generally perpendicular to the rollers 20 and 22, which provide a corresponding tractional rotation to the outer toroid or outer race means 27. As stated in the preferred embodiment, it is the rotation of the inner race elements, that provides a tractional force through the positioned rollers, that furnishes a rotation to the outer race 27, of this particular invention. In addition, it is just as likely that additional pairs of transmission rollers, other than the two pairs as described herein could be utilized in conjunction with the structure and functioning of this transmission means.

Torque transmitted through the continuously variable transmission, 10, is summed or converges on the output shaft 54 via two paths. The first of these paths is the input shaft 12 where a portion of the torque is extracted by the inner race means 14 and transmitted through the rollers, 20,22,24, and 26 to the planetary gear shaft via the outer race means, while the remainder is transferred to the gear 50 mounted on the end of shaft 12. Power can be transferred through the transmission while the rollers 20,22,24 and 26 are positioned at a fixed angle, that is a constant speed ratio between the inner race 14 and outer race or while the rollers are translating to a new angle or speed ratio. In other words, a constant power load, such as an internal combustion engine, can provide a power source to the transmission, and a load, such as a brake or other frictional load, can absorb the power while the rollers are at a significantly steady angle or speed ratio. Also, power can be transferred through the transmission by changing the speed ratio of the continuously variable transmission 10, with an inertial source or load attached to either the input or output, 12 or 54 and another inertial source or load attached to the other shaft, 12 or 54 such that torque is generated by accelerating or decelerating the inertial loads by changing the input and output shaft speeds. Power also can be transferred by a combination of inertial storage and power source and substantially fixed or varying speed ratios.

As previously described, a mechanism allowing free movement of the outer race 27 is integrated into the interconnection of the outer race 27 and the output spider 38. The adjustment mechanism consist of four slots in the output spider 38, where the slots are arranged such that their longitudinal axis is parallel to the shaft 12 as shown in FIGS. 2A and 2B. Fasteners 40, clasp the spider 38 such that torque can be transmitted between the outer race 27 and the spider while allowing full freedom of motion and thereby full force equalization of the rollers and races which may slightly vary within the continuously variable transmission during it operation.

Figure 5:
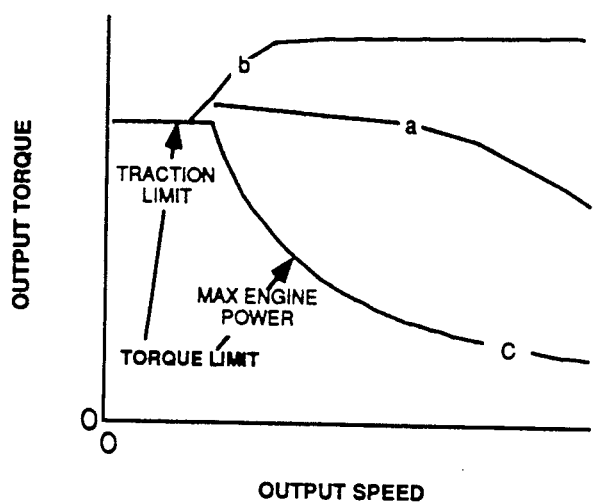
FIG. 5 shows a Cartesian plot of the final output torque characteristic of two continuously variable transmission means configurations versus the output speed.
Figure 6:
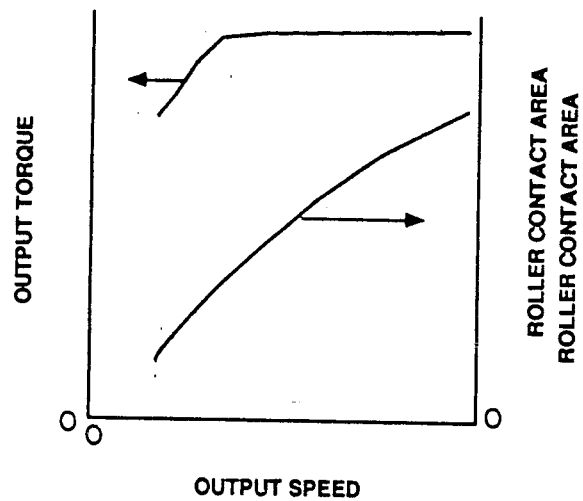
FIG. 6 provides a double y-axis, Cartesian plot of the continuously variable transmission means inner race/roller contact area and output torque versus continuously variable transmission output speed.

It is the summing of the power from the shaft 12 and spider 38 in the planetary gear set 56 that provides the advantages of this invention. Power is transmitted from the central gear 50 to gear 46 where power from the outer race is summed and rotationally transmitted to gear 48 where the power is transmitted via gear 52 to the output shaft, 54. The output torque capacity of this transmission is shown in FIG. 5 by the curve labeled (a). This is compared to curve (c) which is the maximum torque requirement of a typical automobile. Proper sizing of a transmission requires that the transmission output torque capacity exceed the torque requirement of a vehicle or other load to meet useful operational requirements. A continuously variable transmission where the inner race is driven by a power source exhibits a torque trend shown in FIG. 5 as curve (b). In order for this continuously variable transmission to exceed the torque requirement of the automobile, it is believed that the continuously variable transmission must be sized approximately 22% greater in diameter than the continuously variable transmission utilized in this invention which results in an approximate weight increase of 80%. This torque characteristic of the continuously variable transmission unit, is the result of a decreasing roller contact area versus output speed as shown in FIG. 6, curve (b). The torque capacity of the single cavity continuously variable transmission is shown again in curve (a) of FIG. 6 for comparison of trends.

Figure 7:
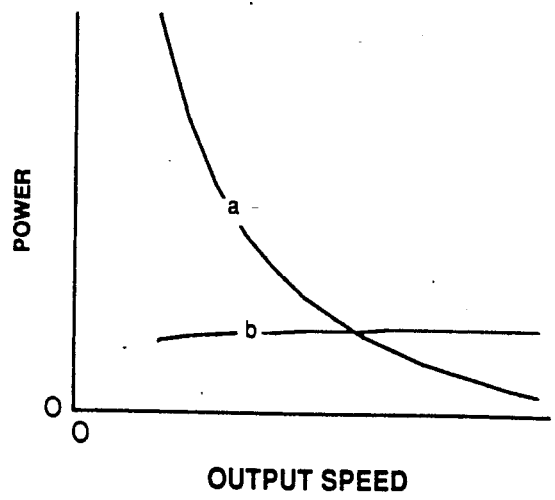
FIG. 7 shows a Cartesian plot of the power transmitted by the continuously variable transmission, curve (a), in comparison to the power produced by the transmission unit, curve (b).

The torque capacity of this transmission, as previously discussed, allows generally for a more compatible adaptation of the continuously variable transmission to an automotive application at a reduced size from the prior art designs. Another characteristic of this invention is the reduced amount of power that passes through the continuously variable transmission at the higher transmission output speed. The continuously variable transmission power requirements in this regime, shown in FIG. 7, curve (a), is less than the power that is produced by the transmission, as shown in FIG. 7, curve (b). This reduced power requirement will improve the transmission efficiency by requiring less power to flow through the generally less efficient continuously variable transmission unit, and the majority of the power to flow through the more efficient epicycle gear train 56 in the higher output speed regime. It can also be noted from FIG. 7 that the power required by the continuously variable transmission in the lower output speed regime is greater than the power produced by the overall transmission. In most automotive applications of this transmission the slightly reduced overall efficiency will be acceptable since generally the majority of the automotive energy is transferred from the engine to the drive wheels at the high output speeds relative to the engine speed.

From the above description it can be seen that this invention has at least two advantages.

(a) the size of the continuously variable transmission is reduced, thereby lessening manufacturing cost and simplifying the design process of packaging the continuously variable transmission into an overall transmission unit; and (b) improve the transmission overall efficiency in the high output speed range.

In the alternative, it is just as likely that the outer race element 27, associated with the support means 38, interconnected through the transmission means 44, can comprise the driving means for this development, being driven by a driving shaft 54, through its transmission driving means 52. In addition, when employed in this manner, the inner race elements 16 and 18, connecting with the shaft 12, become the output means, with the shaft 12 becoming the driven shaft, and furnishing the output from the transmission. In this embodiment, its transmission element 50 becomes a driven element, within the transmission system, to provide for the planetary gear relationship within the transmission means, affording the driven characteristics to what is now the output shaft 12.

Variations or modifications to the subject matter of this invention, the structure of the transmission device itself, and its methods of operation, may occur to those skilled in the art upon reviewing the description of the invention as provided herein. Such variations or modification, if within the spirit of this invention, are intended to be encompassed within the scope of any claims to patent protection issuing upon this development. The description of the preferred embodiment set forth herein is done for illustrative purposes only.

Having thus described the invention what is claimed and desired to be secured by Letters Patent is:

1. A traction transmission mechanism comprising a toric inner race element, a toric outer race element, encircling and complementary with the inner race element, and arranged concentrically therewith, a driving means operatively associated with the inner race element to drive the same, inner and outer race element support means, said inner race element being the driving race, and the outer race element being the driven race, transmission roller means operatively associated with said driving and driven race elements and arranged intermediate thereof for limited pivot between the race elements and to drive by traction force from said driving inner toric race element said driven outer toric race element and being mounted for angular pivotal adjustment to vary the speed of the driven race element, said driving race element being formed of axially separate halves, with means providing for adjustment in the setting of the space between said speparate halves of the driving race element to provide variation of speeds of operation of the transmission mechanism during its functioning, a driven support means operatively associated with said driven outer race element, a planetary gear means supported by the driven support means, at least one transmission gear supported by the planetary gear means and operatively associated with the driven outer race element, a driving element connected with the driving means and its supported driving inner race element, said driving gear element being operatively associated with the planetary gear means, a driven transmission gear mounted for rotation and operatively associated with the planetary gear means to provide an output force for an output driven means of the transmission mechanism.

2. The invention of claim 1 and wherein a series of circular gears formed within the planetary gear means, said gears being radially disposed and mounted for rotation through axes orbitting with the planetary gear means, said series of circular gears providing for the transmission of force from the driven outer race element to the driven transmission gear to provide an output force for the transmission mechanism.

3. The invention of claim 2 and wherein said circular gears within said planetary gear means are operatively associated for power transmission, and said planetary gear means interconnecting with the driven transmission gear, and whereby said driven transmission gear is approximately twice the diameter of the planetary gear means.

4. The invention of claim 1 and wherein there being at least one equalization means operatively associated with one of said transmission roller means and race elements to balance any unequal forces exerted therein during transmission functioning.

5. The invention of claim 2 and wherein said driving means comprising a drive shaft, and said output driven means comprising an output shaft, and said shafts being collinear in their disposition within the transmission mechanism.

6. The invention of claim 2 and wherein said planetary gear means being operatively associated with the outer race element and said planetary gear means being driven thereby, and coupling means interconnecting said driven support means to said outer race element to provide outer race adjustment.

7. The invention of claim 3 and wherein said driving gear element comprises a driving gear, and said driven transmission gear comprises a driven gear each collinear in their mounting within the transmission mechanism.

8. The invention of claim 22 and wherein there being at least one equalization means operatively associated with one of said transmission roller means and race elements to balance any unequal forces exerted therein during transmission mechanism functioning.

* * * * *

UNITED STATES PATENT AND TRADEMARK OFFICE
CERTIFICATE OF CORRECTION

PATENT NO. : 5,044,214.
DATED : September 3, 1991
INVENTOR(S) : John S. Barber, Jr.

It is certified that error appears in the above-identified patent and that said Letters Patent is hereby corrected as shown below:

Claim 8, column 8, line 44, change "22" to ---2---.

Signed and Sealed this

Twenty-ninth Day of December, 1992

*Attest:*

DOUGLAS B. COMER

*Attesting Officer*      *Acting Commissioner of Patents and Trademarks*